United States Patent [19]

Parulski

[11] Patent Number: 5,355,178
[45] Date of Patent: Oct. 11, 1994

[54] MECHANISM FOR IMPROVING TELEVISION DISPLAY OF STILL IMAGES USING IMAGE MOTION-DEPENDENT FILTER

[75] Inventor: Kenneth A. Parulski, Rochester, N.Y.

[73] Assignee: Eastman Kodak Company, Rochester, N.Y.

[21] Appl. No.: 782,040

[22] Filed: Oct. 24, 1991

[51] Int. Cl.$^5$ .......................................... H04N 5/262
[52] U.S. Cl. .................................... 348/620; 348/452; 360/35.1
[58] Field of Search ............... 358/167, 183, 140, 141, 358/105, 147; 360/35.1; H04N 5/262

[56] References Cited

U.S. PATENT DOCUMENTS

| | | | |
|---|---|---|---|
| 3,752,913 | 8/1973 | Connor et al. | 178/6 |
| 4,064,530 | 12/1977 | Kaiser et al. | 358/36 |
| 4,286,281 | 8/1981 | Suzuki | 358/147 |
| 4,530,004 | 7/1985 | Achiha et al. | 358/12 |
| 4,641,188 | 2/1987 | Dischert | 358/147 |
| 4,716,462 | 12/1987 | Wargo et al. | 358/166 |
| 4,768,092 | 8/1988 | Ishikawa | 358/140 |
| 4,897,803 | 1/1990 | Calarco et al. | 395/166 |
| 5,016,111 | 5/1991 | Sakamoto et al. | 358/328 |
| 5,043,802 | 8/1991 | Tarumizu | 358/36 |
| 5,055,920 | 10/1991 | Illetschko et al. | 358/105 |
| 5,159,670 | 10/1992 | Suzuki et al. | 395/164 |
| 5,164,831 | 11/1992 | Kuchta et al. | 358/102 |
| 5,218,455 | 6/1993 | Kristy | 358/403 |

FOREIGN PATENT DOCUMENTS

| | | | |
|---|---|---|---|
| 0372774 | 6/1990 | European Pat. Off. | H04N 5/44 |
| 0410579A2 | 1/1991 | European Pat. Off. | G11B 27/10 |
| 1125081 | 5/1989 | Japan | H04N 5/93 |
| 2114848A | 8/1983 | United Kingdom | H04N 5/02 |
| WO88/00783 | 1/1988 | World Int. Prop. O. | H04N 7/087 |

OTHER PUBLICATIONS

Signal Processing of HDTV, II, Proceedings of the Third International Workshop on HDTV, Turin, IT, 30 Aug.-1 Sep. 1989, Ed.: L. Chiariglione, Elsevier Science Publishers, pp. 677-684, XP000215285; L. Capodiferro: "Interlaced to progressive conversion by median filtering".

17th International Television Symposium and Technical exhibition, 13-18 Jun. 1991, Montreux, CH, pp. 197-208, XP000268889; M. Achiha et al.: "Motion-adpative enhanced decoder and up-converter for PAL signals".

Richard G. Clapp and Joseph F. Fisher, "Waveforms and Spectra of Composite Video Signals" in David G. Fink (ed.), Television Engineering Handbook, McGraw-Hill, New York, 1957, chapter 5.

Yves Faroudja and Joseph Roizen, "Improving NTSC to Achieve Near-RGB Performance", in SMPTE Journal, Aug. 1987, pp. 750-761.

Patent Application 583, 265, Docket Number 59,557 by Ed Dugas.

Primary Examiner—Mark R. Powell
Assistant Examiner—Jeffrey S. Murrell
Attorney, Agent, or Firm—David M. Woods

[57] ABSTRACT

An image motion-dependent mechanism selectively inserts an image modification operator, such as a median filter, into the image signal path of a video display unit, so that loss of definition and introduction of flicker resulting from the use of a median filter in the course of the display of a still or stationary image on an IDTV are effectively eliminated. The selectively inserted image modification operator, which responds to an index code or bit value representative of whether or not the image frame is repeated, may also serve to prevent the generation of cross-luminance and cross-color decoding artifacts, as well as reducing the amount of random noise in the image.

9 Claims, 9 Drawing Sheets

MECHANISM FOR IMPROVING TELEVISION DISPLAY OF STILL IMAGES USING IMAGE MOTION-DEPENDENT FILTER

FIELD OF THE INVENTION

The present invention generally relates to the display of digitized images and, in particular, to mechanism for selectively inserting one or more video signal filters in the video signal processing path in dependence upon whether the image to be displayed is a still (stationary) image or contains motion from frame to frame.

BACKGROUND OF THE INVENTION

Co-pending Patent application Ser. No. 582,305, filed Sep. 14, 1990, now U.S. Pat. No. 5,218,455, by S. Kristy, entitled "Multiresolution Digital Imagery Photofinishing System," assigned to the assignee of the present application and the disclosure of which is incorporated herein, discloses a system diagrammatically illustrated in FIG. 1, in which photographic images, such as a set of twenty-four or thirty-six 24 mm×36 mm image frames of a 35 mm film strip 10, are digitized, processed in accordance with prescribed image reproduction characteristics and then stored on a compact disc for subsequent playback, as by way of a consumer television display. At the front end of the process, the film strip is scanned by a high resolution opto-electronic film scanner 12, such as a commercially available Eikonix Model 1435 scanner. Scanner 12 outputs digitally encoded data (e.g. a 2048×3072 pixel matrix) representative of the internal electronic scanning of a high resolution image sensing array onto which a respective photographic image frame of film strip 10 is projected. This digitally encoded data, or 'digitized' image, is coupled in the form of an imaging pixel array-representative bit map to an attendant image processing (photofinishing) workstation 14, which contains a frame store and image processing application software through which the digitized image is processed (e.g. enlarged, rotated, cropped, subjected to scene balance correction, etc.) to achieve a desired image appearance. Once an image file has been prepared, it is stored on a transportable medium, such as a write-once optical compact disc, using an optical compact disc recorder 16, for subsequent playback by a disc player 20, which allows the image to be displayed, for example, on a relatively moderate resolution consumer television set 22 (e.g. having an NTSC display containing an array of 485 lines by 640 pixels per line), or printed as a finished color print, using a high resolution thermal color printer 24.

One particular mechanism for controlling the manner in which a digitized image that has been recorded on disc is read out and displayed is described in copending U.S. patent application, No. 583,265, filed Sept. 14, 1990 by Parulski, et al, entitled "Mechanism for Controlling Presentation of Displayed Image", assigned to the assignee of the present application and the disclosure of which is incorporated herein. In accordance with this display mechanism, two dimensional image data of a prescribed spatial resolution less than that of the display device itself is subjected to a decimation or cropping mechanism in the course of reading out the imagery data.

Because of their very high resolution, the video images stored on disc contain more detail than can be displayed using a conventional TV display, reproduction signals for which typically originate with NTSC or PAL format video cameras. In particular, 35 mm color film images processed in accordance with the mechanisms described in the above referenced Kristy and Parulski et al applications have the capacity to store a much larger quantity of vertical high spatial frequency information than do conventional TV images derived from video cameras. This additional vertical high spatial frequency content sometimes causes a raster scan display artifact known as "interlace flicker" where the vertical edge details (associated with sharp horizontal lines, for example) will flicker visibly at a 30 Hz rate on normal interlaced NTSC displays. This interlace flicker occurs because the TV monitor displays every other line of the image during the first 1/60 second field time, and then displays the lines in between during the next 1/60 second field time, as diagrammatically shown in FIG. 2. In regions of an image having significant vertical detail, the lines of the first field will be quite different from the lines of the second field, so these regions of the image will appear to flicker at a 30 Hz rate. The amount of interlace flicker in an image will depend upon the image content and the way in which the image was photographed.

FIG. 3 is a simplified block diagram of the relevant portion of circuitry incorporated in a conventional, currently commercially available improved definition television (IDTV) system for reducing interlace flicker by improving vertical definition. In such an IDTV system, a receiver up-converts a 2:1 interlaced television signal to a progressive scan display format for use with a 32 KHz line rate CRT. In accordance with the operation of an IDTV system, rather than interlacing alternating raster lines, each line of the display is scanned every 1/60 second. Since conventional NTSC television signals provide video data for scanning every other raster line each 1/60 second, for each 1/60 second the IDTV system generates video data for the display lines which are not scanned in a conventional television system.

Since television systems normally display moving images, the image data to be scanned onto the interlaced raster lines must be generated while taking the motion into account. This is true even if the television source is a still image, since still images may be manipulated in such a way as to be temporarily in motion. Manipulation of still images typically includes zooming (i.e., magnifying) the still images being displayed, panning (i.e., moving side-to-side or up-and-down) through the image, and changing from one still image to a different still image.

An image data pixel value for a pixel of a raster line not conventionally scanned can be generated by an IDTV system by using a number of signal processing mechanisms. One common approach is to generate a median value for the pixel based on the current values of the image data pixels immediately above and below the pixel to be generated, and on the value of the pixel during the previous 1/60 second, when the raster line containing the pixel was scanned.

The IDTV system of FIG. 3 includes a memory, shown as a field store 101, for storing video data extracted from a video input signal received by the system for display. Also shown is a delay line 102, coupled to receive the input video signal. A median filter 104 is used to produce pixel data for the raster lines not provided by the interlaced video input. The median filter 104 produces median data, i.e., interpolated data, for a given raster line based on the current data being scanned on the upper and lower adjacent raster lines and data which was scanned onto the given raster line during the previous 1/60 second. The median filter 104 has inputs coupled to outputs of the field store 101 and the delay 102, and has another input coupled to directly receive the input image data. The input video data and the output of the median filter 104 are subjected to 2:1 time compression operations at 106A and 106B. The compressed signals are applied to respective inputs of a 2:1 multiplexer, the output of which is coupled to a display unit 108, shown as a 60 frame/sec progressive scan display.

An IDTV system employing a median filter produces satisfactory results with a moving image such as regular television programming, or with a changing still image such as an image zooming or panning responsive to user commands. However, a median filter is not well suited for producing progressive scan conversion on stationary still images, such as those to be played back from a photo compact disc system, because the median filter acts to reduce the definition of images having high spatial frequencies in the vertical direction. In addition, in practice it has been found that such filtration actually adds flicker in still images because of the interlaced scanning.

To understand why this is the case, consider a situation in which first, second, third, and fourth raster lines of a stationary still image are alternating black, white, black, and white, respectively. During a first 1/60 second, the first and third lines are scanned with black data. The median filter generates interpolated data for the second line based on the present data for the first and third lines (both black) and the data for the second line from the previous 1/60 second (white). One white and two blacks produce a median value of black. Thus, the second line is scanned black. During the next 1/60 second, the second and fourth lines are scanned white. The median filter generates interpolated data for the third line based on the present data for the second and fourth lines (both white) and the data for the third line from the first 1/60 second (black). Now, two whites and one black produce a median value of white. Thus, the third line is scanned white. It will be seen, therefore, that a median filter both reduces definition and generates flicker, both undesirable results, if an interpolated median value for a stationary still image is different from the actual value because of differing adjacent values.

Reproduction signals produced by CD player 20 (FIG. 1) may be encoded into NTSC composite color signals or PAL composite color signals. To form composite color signals, red, green and blue component signals are subjected to a transform matrix to form a luminance signal (Y) and a pair of color difference signals (C1), (C2). The two color difference signals are modulated in quadrature on a high frequency color subcarrier. This color encoding process is described, for example, in the publication entitled "Television Engineering Handbook," Second Edition, edited by K. Blain Benson, McGraw Hill Book Company, New York 1986.

Because the luminance and modulated color difference signals are combined into a single NTSC or PAL composite signal, the NTSC or PAL television display incorporates circuitry to decode the composite color signal back into the red, green and blue component signals, thereby enabling the color image to be properly displayed. Two well known artifacts known as "cross color" and "cross luminance", and which are described in detail in an article entitled "Improving NTSC to Achieve Near-RGB Performance" by Yves Faroudja and Joseph Roizen, SMPTE Journal, August 1987, pp 750–761, are associated with images that have been decoded from NTSC or PAL composite color signals. The first of these artifacts, known as "cross color", occurs when high frequency luminance information is mistakenly decoded as color information. The second artifact, known as "cross luminance", occurs when chrominance information is mistakenly decoded as high frequency luminance information.

So long as the image contains no motion, from frame to frame, both cross luminance and cross color can be eliminated by using a frame delay comb filter to separate the luminance signal and the quadrature modulated chrominance signal. U.S. Patent to Achiha et al, U.S. Pat. No. 4,530,004, entitled "Color Television Signal Processing Circuit" describes circuitry, diagrammatically illustrated in FIG. 4, for separating luminance and chrominance signals on the basis of the difference signals from the composite color television signal between adjacent fields or frames. As detailed in the Achiha et al patent, an NTSC composite color television signal fed to a circuit input terminal 9 is applied to a subtraction circuit 11 along with a signal associated with the preceding frame and which is delayed by means of a frame memory 10 having a storage capacity of 525 H by an amount corresponding to one frame period of the television signal, (where H represents the time for one horizontal scanning period). Subtraction circuit 11 produces an output signal in which the chrominance carrier component is doubled in magnitude and the luminance component is removed. Accordingly, when the output signal from subtraction circuit 11 is passed through a coefficient circuit 12 with a coefficient of one-half, a signal is produced which is an average of the chrominance component over the inter-frame. This average signal is then passed through a band-pass filter 13, thus producing at output terminal 17 a signal having a chrominance carrier signal C from which the luminance signal component has been removed. On the other hand, the NTSC signal is partly fed to a delay circuit 14 having the same delay time as bandpass filter 13 for delay time adjustment and is then applied to subtraction circuit 15, wherein the chrominance carrier signal C is subtracted from the NTSC signal, to produce the luminance component Y of the NTSC signal.

If the image contains motion, artifacts similar to cross-luminance and cross color may be produced by the circuit of FIG. 4, when moving high frequency luminance information is mistakenly decoded as color information, and moving high frequency chrominance information is mistakenly decoded as color information. As a result, simple frame rate comb filters cannot provide satisfactory decoding of composite color signals from moving television images.

An additional problem occurring in video images is the fact that transmitted television signals often contain significant amounts of noise that are injected into the television signal path. Such noise is especially noticeable when viewing still television images, since moving objects or rapidly changing scenes tend to visually mask the noise to some degree.

FIG. 5 diagrammatically illustrates an example of a recursive filter circuit that may be employed to reduce noise in television images. In particular, FIG. 5 illustrates a frame averaging circuit which effectively corresponds to the illustration in FIG. 1 of the U.S. Patent of Kaiser et al, U.S. Pat. No. 4,064,530 entitled "Noise Reduction System for Color Television". Video signals applied to an input terminal 41 are coupled through a variable attenuator 43 which scales the video input signal values by the difference between unity and a transmission constant 'a' the value of which is some fraction of unity. The output of variable attenuator 43 is coupled to one input of adder 45 a second input of which is coupled to the output of a variable attenuator 53 whose transmission constant is 'a'. The output of adder 45 is coupled to a frame delay 47, the output of which is subject to chroma inverter 51 and applied to output terminal 55. The output of chroma inverter 55 is itself scaled by attenuator 53 and applied to adder 45 to be combined with the fractionally scaled video input signal.

SUMMARY OF THE INVENTION

In accordance with the present invention, there is provided a mechanism for selectively inserting an image modification operator into the image signal path of the display unit, so that the above described loss of definition and introduction of flicker resulting from the use of a median filter in the course of the display of a still or stationary image on an IDTV are effectively eliminated. In addition, the selective insertion mechanism in accordance with the invention serves to prevent the generation of cross-luminance and cross-color decoding artifacts, as well as reducing the amount of random noise in the image.

The present invention is based upon an understanding that a television receiver can be designed to display a higher quality static image if the receiver can recognize repeated image frames and that the best way to recognize repeated frames is for the image source to tell the receiver which video frames are repeated frames. In a photo CD compact disc player, a control signal, termed a video index code, is generated in response to manipulation of a displayed image user command. If the user enters a command for manipulating an image being displayed, the video index code has a first value. The video index code has a second value in the absence of such image manipulation. The video index code is incorporated into the video signal which is supplied to the IDTV display. In response to a first value of the video index code, the IDTV display uses image processing that is optimized for motion images. In response to a second value of the video index code, the IDTV display uses image processing optimized for still images.

The image processing mechanism may employ a number of operations, including interlace to progressive scan conversion, luminance/chrominance separation, and noise reduction. The mechanism which is optimized for motion images is similar to methods currently employed in the prior art. For example, progressive scan conversion in the motion (no-repeated frame) mode can use the technique described below with reference to FIG. 6. Luminance/chrominance separation in the image motion mode may employ the mechanism described in the above-cited Faroudja et al article, and noise reduction in the image motion mode can use the technique embodied in FIG. 3. During the still (repeated image frame) mode, progressive scan conversion is provided by field repetition, luminance/chrominance separation can use the technique described with reference to FIG. 5, and noise reduction can use a method similar to that described with reference to FIG. 3, but with a feedback coefficient suitable for repeated image frames.

The CD player is capable of storing digitized still image data in image data files that have been stored on an optical compact disc and includes a compact disc reader, such as a laser pickup. The player responds to user commands, such as those provided by means of a control panel or a CD player remote control device. Through one of these input devices, the user enters commands for selecting one of a plurality of image data files for playback and display, and commands for manipulating the displayed image, i.e., for magnifying a desired portion of the image (zooming), moving from side to side or top to bottom (panning), etc.

As described in the above-referenced co-pending Parulski et al application, manipulation of the displayed image involves selecting a sub-matrix of the stored data for display. Additionally, manipulation such as zooming and panning involves changing the sub-matrix incrementally as a function of time. Zooming increases or decreases the sub-matrix of an image pixel array as a function of time. For instance, if rows 13 through 496 of a 512 row pixel array are displayed on a 484 row display unit, the sub-matrix zooms, incrementally decreasing in size, to rows 12 through 497, rows 11 through 498, rows 10 through 499, etc., in successive time intervals. Columns of the matrix are similarly and concurrently subjected to a zoom or magnification scan. Any decimation necessary to fit the desired sub-matrix into the display unit is concurrently effected on the data accessed from memory. Zooming to increase in size decreases and increases, respectively, upper and lower numerical limits of the rows and columns in essentially the same manner as the increase in upper and decrease in lower limits.

Panning increases or decreases both the upper and lower limits of either the rows or the columns of the sub-matrix, while leaving the other alone. For instance, in the above example, the columns of the sub-matrix remain the same, while the rows of the sub-matrix change incrementally from 13 through 496, to rows 14 through 497, 15 through 498, 16 through 499, etc., in successive time intervals.

During manipulation of the image, such as panning, zooming, or changing to a new image, image motion will be apparent on the display. By contrast, in the absence of such manipulation, a stationary still image is displayed. In accordance with the invention, a video index code has a first value when the displayed image is zooming, panning, etc., and a second value when the image is stationary.

One embodiment of a receiver in accordance with the invention includes a memory for storing image data read out of the data base and an image signal modifier in the form of a median filter for filtering the image data in order to reduce the effects of vertical or temporal aliasing, which occur during motion, i.e., during zooming or panning of a still image. The median filter is coupled to receive data stored in a field store, data received directly from the data base, and data delayed by a delay device. A 2:1 multiplexer has inputs coupled to the median filter and directly to the field store. Depending on the value of the video index code, the multiplexer selects either the output of the memory or the output of the median filter. If the code has a first value, indicating that the source of the data is a still image device such as a still photo compact disc system, the multiplexer selects the memory. As a result, unfiltered image data is displayed. Interline flicker is not present, since the image is a still image, and no flicker is added due to the effects of filtration on the interlaced scans.

In accordance with a second embodiment of the image motion-dependent filtering mechanism of the present invention, the selective filtering mechanism is employed in conjunction with a luminance/chrominance separation using a combination of line rate comb filter and a frame rate comb filter of the type described above with reference to FIG. 4. In such a selective comb filter architecture, video data is coupled through a selected one of a line rate comb filter and a frame rate comb filter in dependence upon whether the image is a still image (repeated frames), in which case the frame rate comb filter is employed, or a motion image (non-repeated frames), in which case a repeated frame index bit steers the video data through a line rate comb filter.

In accordance with a third embodiment of the image motion-dependent filtering mechanism of the present invention, the selective filtering mechanism is employed in conjunction with a filter for reducing noise in television images using a modified recursive filter architecture of the type described above with reference to FIG. 5. Input video data is coupled through a selected one of a pair of noise reduction paths employing the filter architecture of FIG. 5. For still images (repeated frames), a repeated frame index bit steers the video data through a first attenuator path. For motion images (non-repeated frames), the repeated frame index bit steers the video data through a second attenuator path.

The image motion-dependent filter architectures of the first through third embodiments may be integrated together to eliminate interlace flicker, perform chrominance separation and reduce noise for both still and motion images. A composite video signal is initially coupled to noise reduction unit. The noise reduced signal output of noise reduction unit is, in turn, supplied to luminance/chrominance separation unit. The chrominance component output from separation unit is converted via a demodulator into respective in-phase and quadrature components, which are coupled, together with the luminance output of the luminance/chrominance separation unit to a YIQ/RGB conversion matrix for application to an interlaced-to-progressive scan conversion unit, the output of which is coupled to progressive scan display. Each selective filter unit is coupled to receive the same repeat frame index bit for controlling the respective multiplexers of the selective filtering mechanisms of the units.

DETAILED DESCRIPTION

Figure 1:
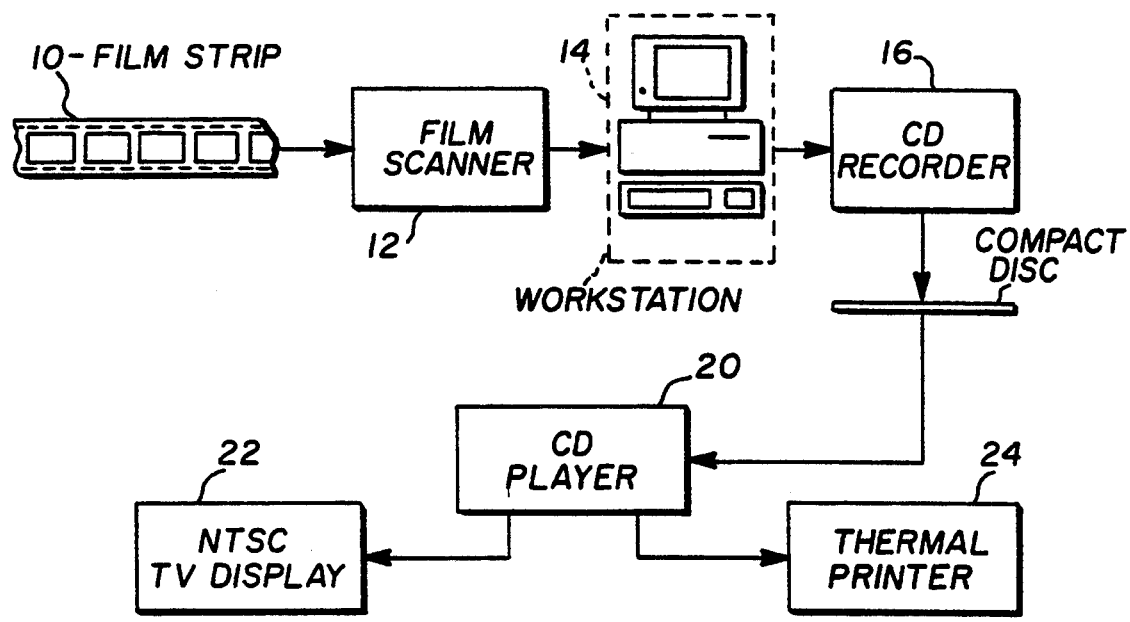
FIG. 1 is a diagrammatical illustration of a digital image processing system described in co-pending Patent application Ser. No. 582,305, filed Sep. 14, 1990, by S. Kristy, entitled "Multiresolution Digital Imagery Photofinishing System;"
Figure 2:
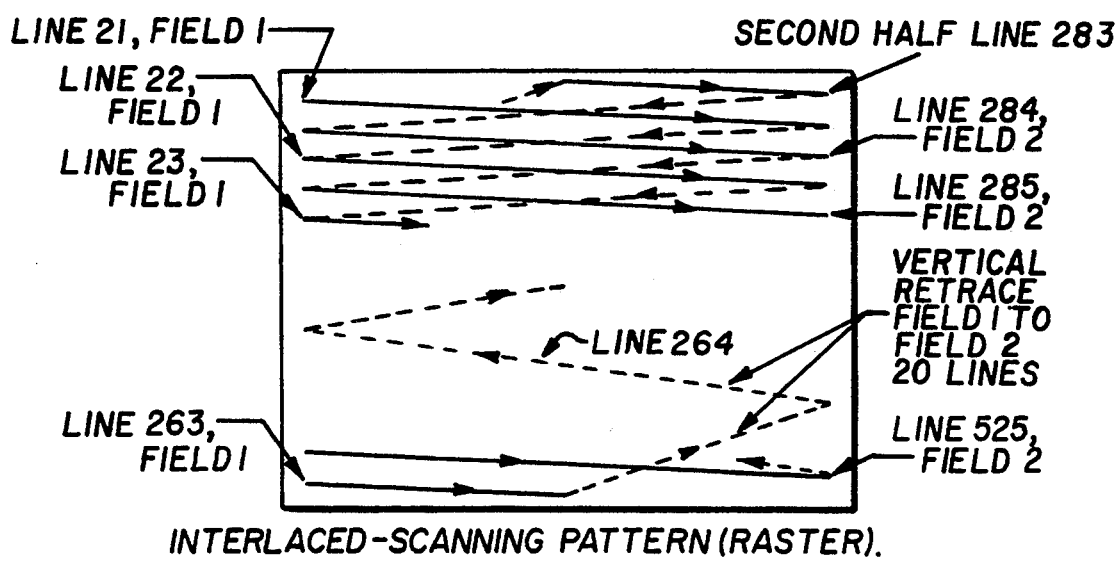
FIG. 2 is a diagram of interlace scanning used in a conventional television display.
Figure 3:
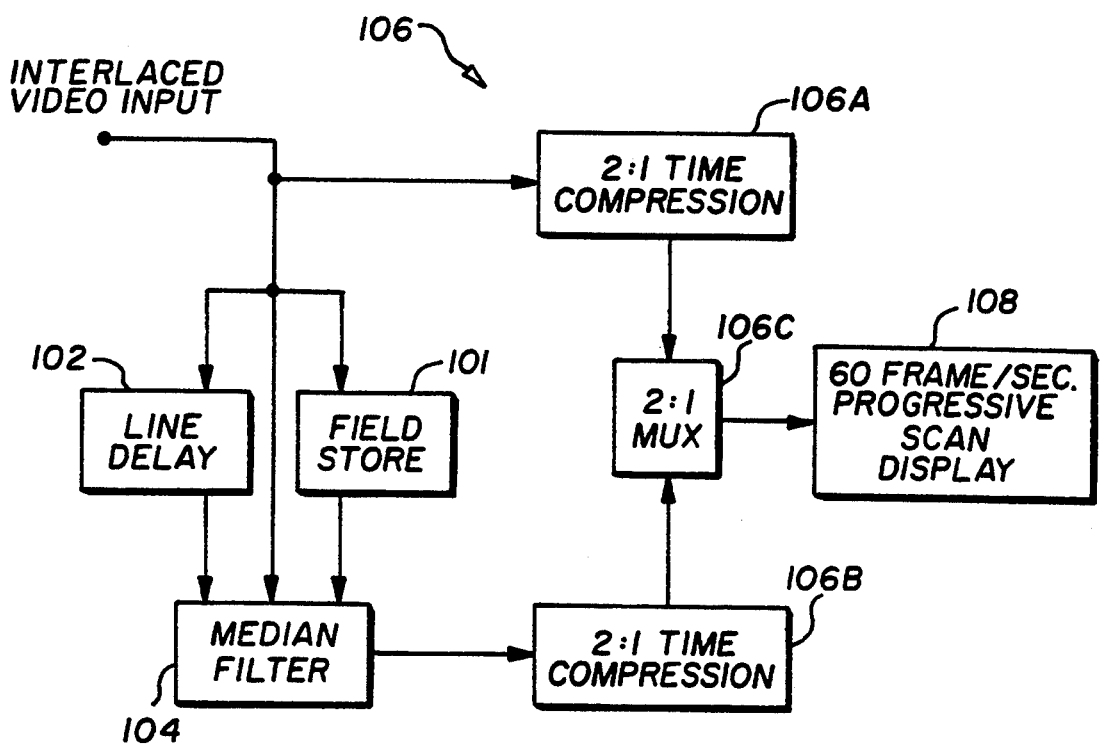
FIG. 3 is a simplified block diagram of a portion of circuitry incorporated in a conventional, currently commercially available improved definition television (IDTV) system for reducing interlace flicker by improving vertical definition.
Figure 6:
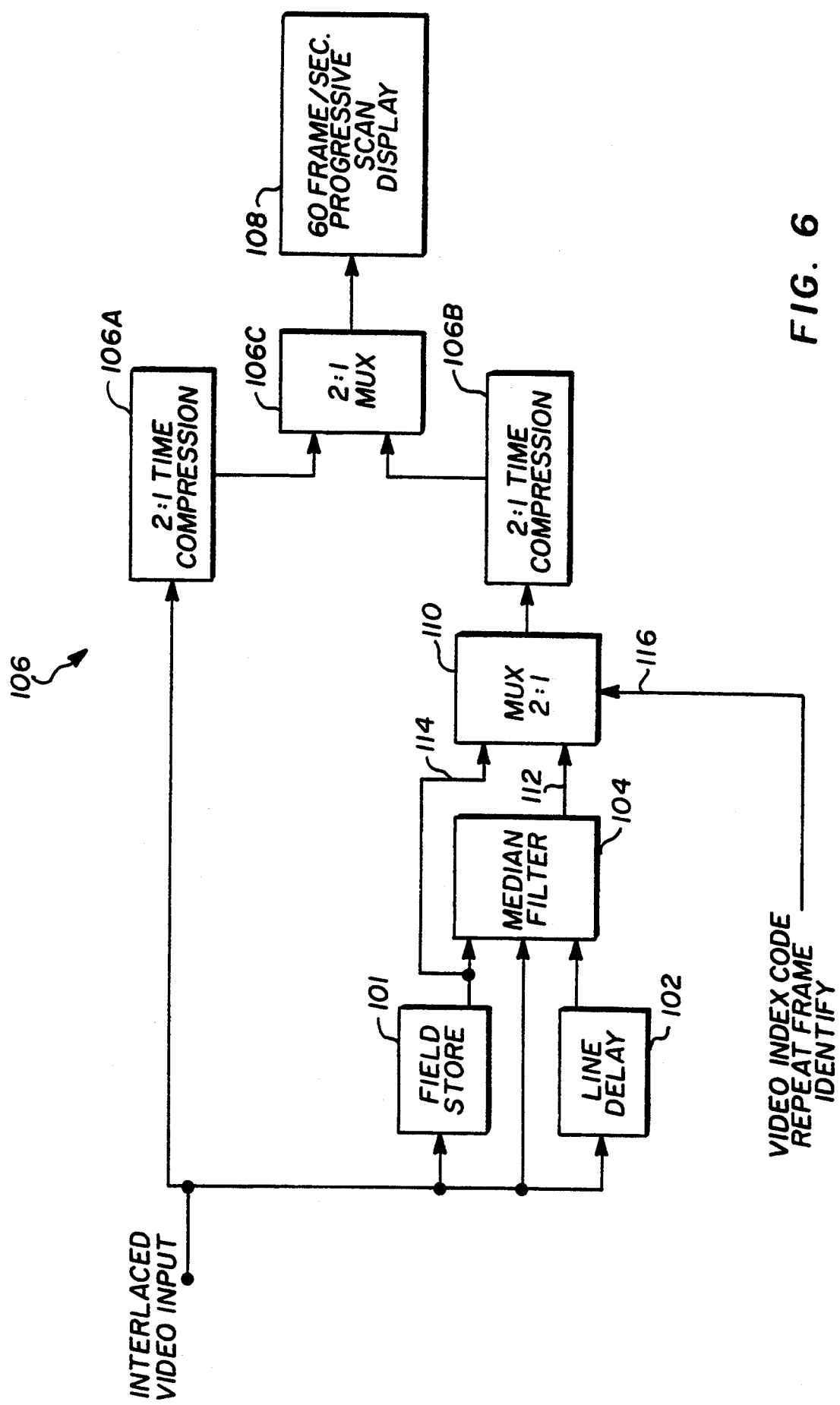
FIG. 6 diagrammatically illustrates a system block diagram of an IDTV display system according to the invention.

FIG. 6 diagrammatically illustrates a system block diagram of an IDTV display system employing the image motion-dependent filtering mechanism according to the invention. Components similar to those in the diagrammatic illustration of the filtering mechanism of FIG. 3 are numbered similarly. However, in accordance with the invention, there is additionally provided image mode detection circuitry, in the form of a 2:1 multiplexer, for selectively bypassing the median filter 104 and for coupling the output of the field store 101 directly to the scan converter 106. The multiplexer 110 has a first input 112 coupled to the output of the median filter 104, and a second input 114 coupled directly to the output of the field store 101.

The multiplexer 110 selects one of its inputs, i.e., couples one of its inputs through to its output, in response to a control input 116. In accordance with the invention, control input 116 receives a (single digit) video index code having first (e.g. 0) and second (e.g. 1) values produced by a device which provides the input image data to the system of FIG. 6. In response to the first and second values, respectively, multiplexer 110 couples its first output 112 or second output 114 through to its output.

Figure 7:
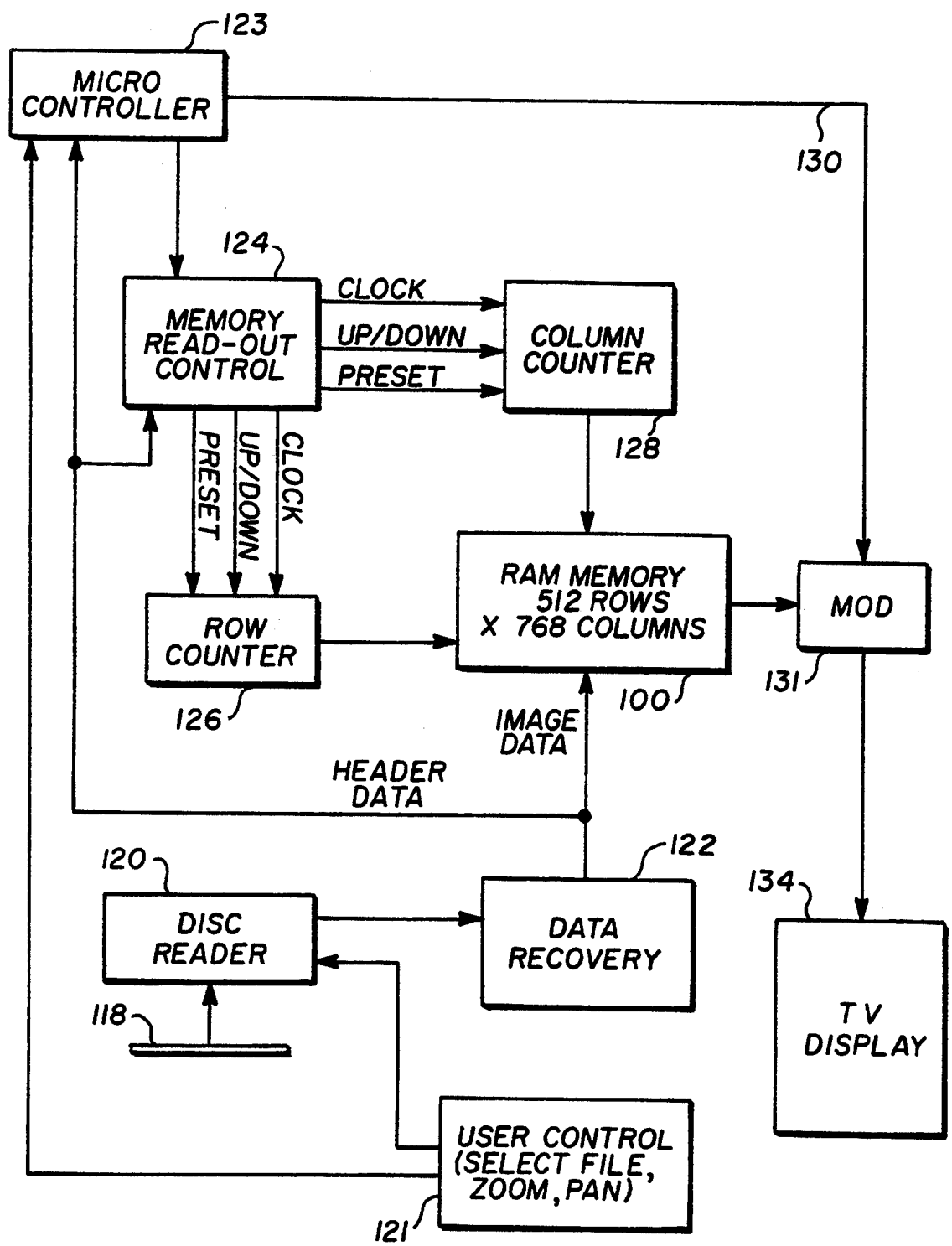
FIG. 7 is a block diagram of the framestore accessing circuitry for use with a photo CD player, and which both provides image data and a video index code to the IDTV system of FIG. 6.

FIG. 7 is a block diagram of the framestore accessing circuitry described in the previously referenced Parulski et al application, namely for use with a photo CD player, and which both provides image data and a video index code to the IDTV system of FIG. 6. In the player framestore access circuitry of FIG. 7, a (write once) compact disc 118, which serves as an image data base and contains a plurality of image data files, is coupled to a disc reader 120. Disc reader reads a desired file from the disc 118 in response to a user command from a user control interface, such as the player's front control panel or a remote control device, 121. The user control interface 121 allows the user to command that a displayed image be manipulated by zooming, panning, etc. The image data file read from the disc 118, including the image data, is supplied to a data recovery unit 122. In addition, in response to a user input command, user control interface 121 produces a video index code having a value indicative of whether a still image is to be displayed, or whether the image is, in a effect, a 'motion mode' image, e.g. being zoomed, panned, etc., in response to user control.

Data recovery unit 122 extracts the image data from the file on disc, and the image data itself is coupled to an image frame store, such as a 512×768 random access memory 100 for storage. Each memory address, uniquely specified by row and column address inputs, stores imagery data for one pixel. In a color display, data for one pixel may encompasses eight bits per color. For each of primary colors red, green, and blue, the storage capacity of memory 100 may be more completely described as a 512 row×768 column×24 bit memory.

A microcontroller 123 and an associated memory controller 124 effect the generation of address inputs to memory 100. In the preferred embodiment shown, memory locations are addressed by row and column address codes produced by row counter 126 and column counter 128. Signals for loading, incrementing, or decrementing the values in the row and column counters 126, 128 are provided by the memory controller 124. Of courser other arrangements for addressing the memory 100 familiar to practitioners in the art are alternatives to the memory address circuitry shown and described here. Microcontroller 123 receives additional information from the user control interface 121. In accordance with the commands, the memory controller 124 determines which rows or columns are to be decimated, which rows or columns are to be cropped, how the upper or lower row or column limits of any submatrices are to be changed over time for panning or zooming, etc., as described in the above-referenced co-pending Parulski et al application.

The CD player further contains a modulator 131 which modulates the image data to be displayed into a form compatible with the display unit. Modulator 131 is coupled to controllably modify image data access from framestore 100 in accordance with requested decimation, cropping, zooming, panning, etc. The modulated signal is coupled to an output of the CD player, for application to the IDTV display unit of FIG. 6, shown in FIG. 7 at 134. By way of a control line 130 microcontroller 123 supplies a video index code value based on the value of the code from the user control 121. This video index code is incorporated into the modulated signal together with the image data. The IDTV display 134 utilizes a screen blanking interval between successive 1/60 second intervals in which image data is scanned. In accordance with the invention, the video index code is inserted by the modulator 131 into the modulated signal during these blanking intervals, between periods of time in which the image data for display is inserted into the modulated signal. The IDTV display extracts the video index code and couples the code to the multiplexer 110 (FIG. 6).

For the IDTV display unit of FIG. 6, data in field store 101 extracted from the modulated signal is coupled to compression unit 106B for display if the video index code has a value indicating that the data represents a still or stationary image and no motion (zooming, panning, etc.) is taking place. If the image data is from an image being manipulated, and the video index code has a second value so indicating, then the data from the field store 101 which has been filtered by the median filter 104 is coupled through the multiplexer 110 to compression unit 106B for display.

An IDTV system employing the mechanism of the invention may be coupled to a program source other than a CD player and which does not provide a video index code during a blanking interval of the modulated signal. For backward compatibility with systems which do not produce a video index code, when the IDTV display 134 does not receive a video index code, it interprets the lack of a video index code as a video index code having a value indicating that the data is from a moving image. The multiplexer 110 accordingly selects the output of the median filter 104.

To further facilitate this backward compatibility, the video index code for an image being manipulated has a value which, when incorporated into a modulated signal, appears as a modulated signal in an idle state, i.e., carrying data consisting entirely of 0 bits. Where digitized image data is contained in the modulated signal, this video index code may have the value 0 to indicate that the image is a moving image, and a value 1 to indicate a still image. In systems which do not produce a video index code in the manner described above, a modulated signal appearing during a blanking interval will contain no data, since no data is to be displayed during the blanking interval. Such a signal is interpreted as containing data bits having the value 0. Thus, IDTV display 134 will treat such a modulated signal as containing a video index code for moving image data, and (median) filter the data accordingly.

Figure 8:
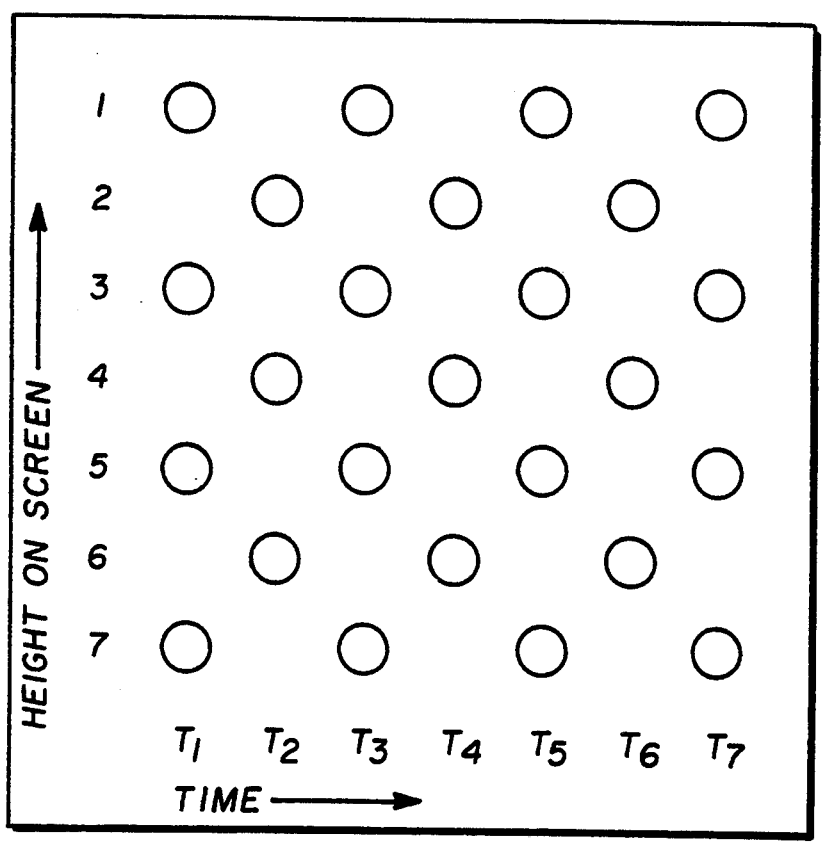
FIG. 8 represents a conventional scanning arrangement, in which the raster lines are scanned with image data in an interlaced manner.
Figure 9:
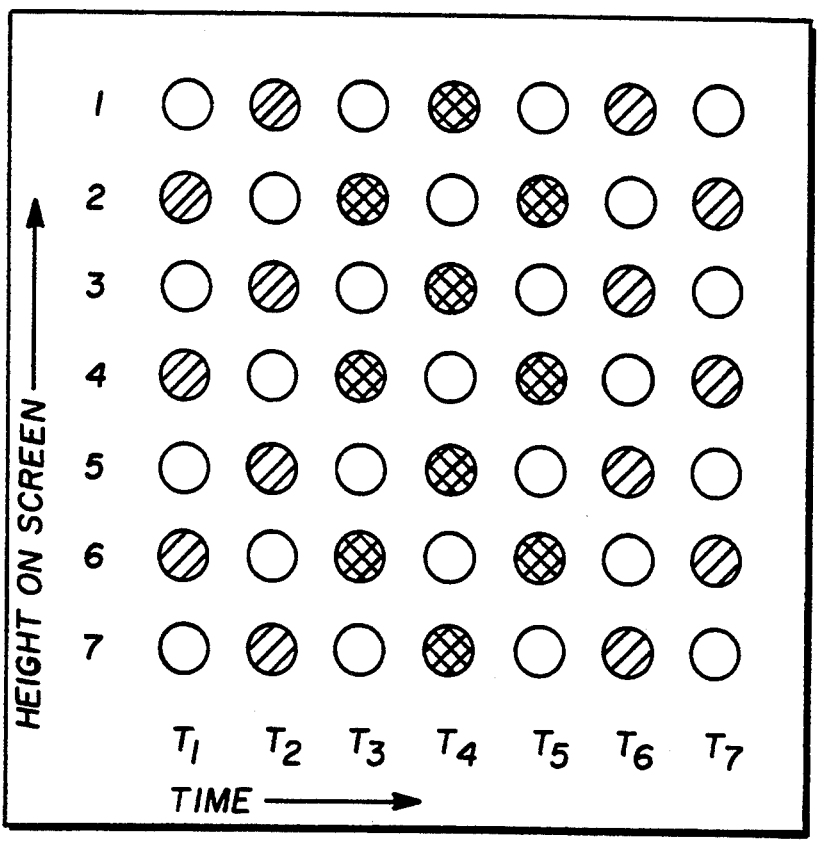
FIG. 9 shows a portion of a display used with an improved definition television (IDTV) system employing the selective filtering mechanism of the invention.

FIGS. 8 and 9 diagrammatically illustrate image data scanned onto several contiguous raster lines of a video display during a short time period, for a conventional system and in accordance with the present invention, respectively. Each time interval, denoted along the bottom of FIGS. 8 and 9 as $T_1$, $T_2$, $T_3$, etc., represents 1/60 of a second. Time moves forward from left to right. The raster lines, which run from left to right and are arranged above and below each other, are represented as circles which, likewise, are above and below each other. For convenience, the raster lines are numbered, in descending order, 1 through 7. Thus, each of the illustrations of FIGS. 8 and 9 may be thought of as a 7×7 array, each point on the array corresponding with a given raster line at a given time interval. There is a one-to-one correspondence between the 49 array points in the two arrays shown in FIGS. 8 and 9.

FIG. 8 represents a conventional scanning arrangement, in which the raster lines are scanned with image data in an interlaced manner. In other words, at time $T_1$, lines 1, 3, 5, and 7 are scanned; at time $T_2$, lines 2, 4, and 6 are scanned; at time $T_3$, lines 1, 3, 5, and 7 are scanned, etc. To distinguish between scanned and unscanned raster lines, the diagrammatic illustration of FIG. 8 has a circle at each point on the array representing a raster line which is scanned at that time interval, and a blank space at each array point representing a raster line not scanned at that time interval. Thus, for instance, the array points representing lines 2, 4, and 6 at time $T_1$ have no circles because they are not scanned at that time.

FIG. 9 shows a portion of a display used with an improved definition television (IDTV) system employing the selective filtering mechanism of the invention. Circles appear at all 49 points on the 7×7 array, indicating that all raster lines are scanned every 1/60 second. Since the circles in FIG. 8 are blank, corresponding circles in FIG. 9 representing the same line scans are also blank. However, line scans which would be omitted in a conventional system but are employed in an IDTV system are shown in FIG. 9 as having hatchmarks. This hatchmarking serves to distinguish these line scans for IDTV from line scans for conventional interlacing. No specific representation is intended about the color or data content of the line scans.

In accordance with the invention, the hatchmarked circles represent IDTV scan lines and associated with image data which is either derived from a previous scan of the same lines (in the case of a stationary still image), or are generated by the median filter 104 in the case of a moving image. The hatchmarked circles are hatchmarked in two different ways to define three time periods. During a first time period including the time intervals $T_1$ and $T_2$, a still photo displayed on the display unit is stationary. Thus, a video index code indicating a stationary image is generated, and multiplexer couples data from the image memory to the display unit without median filtering. This data is represented as circles with upward-sloping diagonal hatchmarks. Line 1 at time $T_2$, line 2 at time $T_1$, line 3 at time $T_2$, etc., are (IDTV) scanned with unfiltered data stored from the previous scan. That is, lines 1 and 3 are scanned at time $T_2$ with the same data with which they were scanned at time $T_1$.

During a second time period including time intervals $T_3$, $T_4$, and $T_5$, the user operates user interface control device 121 to manipulate the displayed image, for instance to zoom the image and increase the magnification of a section of the image of interest. Since the image is in motion, it can be expected that such motion will cause flicker in the displayed image, thus necessitating the use of a median filter in the image signal path. For this purpose, a video index code is generated indicating that the image is in motion, and the multiplexer now couples the median filtered data at the output of the median filter to the display unit. This filtered data is represented in FIG. 9 as cross-hatched circles. Line 1 at time $T_4$, line 2 at times $T_3$ and $T_5$, line 3 at time $T_4$, etc., are (IDTV) scanned with median filtered data.

After time $T_5$, the user stops zooming the image. During the subsequent time period, including the time intervals $T_6$ and $T_7$, the image is once again stationary. Accordingly, a new video index code value representative of a stationary image is generated, and the multiplexer is once again operated to couple the unfiltered data directly out of the image memory to the display unit. As described previously, this data is represented in FIG. 9 as circles with upward-sloping diagonal hatchmarks. Specifically, line 1 at time $T_6$, line 2 at time $T_7$, line 3 at time $T_6$, etc., are (IDTV) scanned with unfiltered data stored from the previous scan.

Thus, as described above, interline flicker is reduced for moving images, including pans, zooms and changes in still images, while stationary still images retain high definition and avoid interline flicker that would be produced if the data were subjected to a median filter. If a conventional IDTV system such as that shown in FIG. 3 is used, then all of the IDTV scanned circles in FIG. 9 would have cross-hatching to represent filtered data. As a result, during time intervals $T_1$, $T_2$, $T_6$, and $T_7$, filtered data in stationary still images would reduce the image definition and, in some cases, generate undesirable flicker. However, an IDTV display coupled with a CD player using the selective filtering mechanism in accordance with the present invention avoids this loss of definition and flicker generation in stationary images by scanning raster lines with stored unfiltered data. As a result, the image quality is enhanced both for stationary and moving images.

Figure 4:
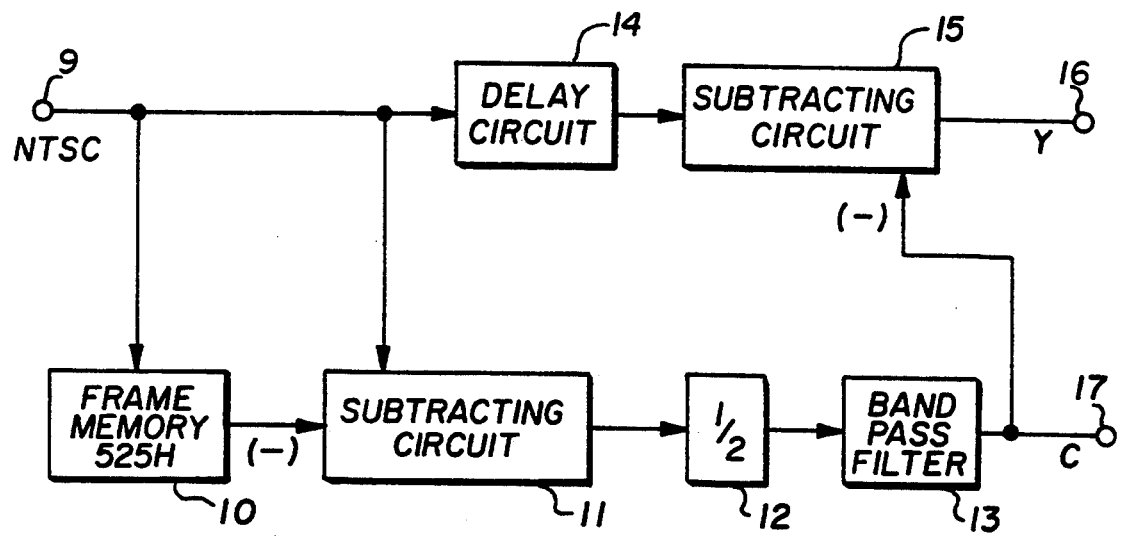
FIG. 4 diagrammatically illustrates a circuit detailed in the U.S. Patent to Achiha et al, U.S. Pat. No. 4,530,004, for separating luminance and chrominance signals on the basis of the difference signals from the composite color television signal between adjacent fields or frames.
Figure 10:
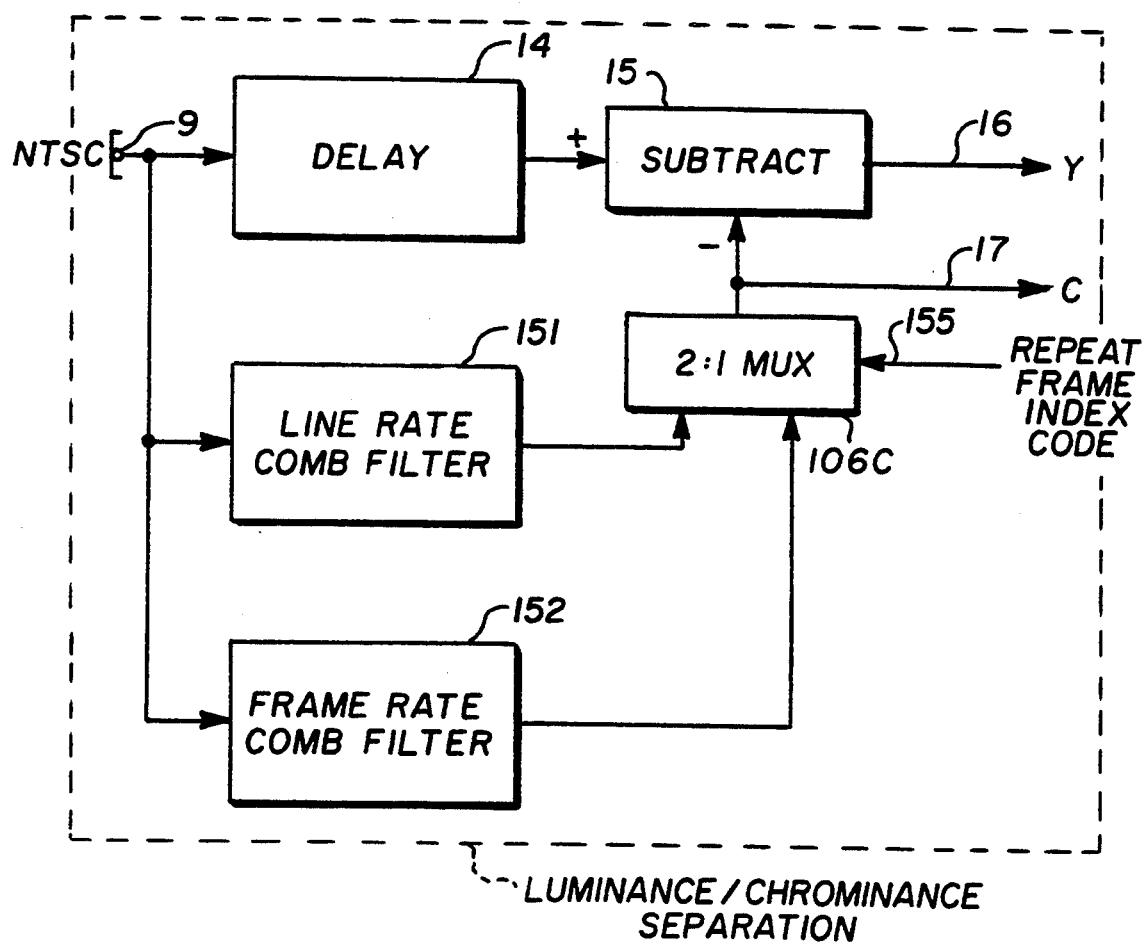
FIG. 10 diagrammatically illustrates an application of the image motion-dependent filtering mechanism of the present invention for eliminating cross luminance and cross color, using a combination of line rate comb filter and a frame rate comb filter of the type shown in FIG. 4.

FIG. 10 diagrammatically illustrates an application of the image motion-dependent filtering mechanism of the present invention for eliminating cross luminance and cross color, using a combination of line rate comb filter and a frame rate comb filter of the type described above with reference to FIG. 4. In the selective comb filter architecture of FIG. 10, a line rate comb filter 151 and a frame rate comb filter 152 (comprised of components 10-13 of FIG. 4) are each coupled to receive the video signal at input terminal 9. Their outputs are coupled to respective inputs of 2:1 multiplexer 106C, the output of which is coupled to subtraction circuit 15 and the select input 155 of which is responsive to a repeat frame index bit. For still images (repeated frames), the repeated frame index bit steers the output of multiplexer 106C to the output of frame rate comb filter. For motion images (non-repeated frames), the repeated frame index bit steers the output of multiplexer 106C to the output of line rate comb filter.

Figure 5:
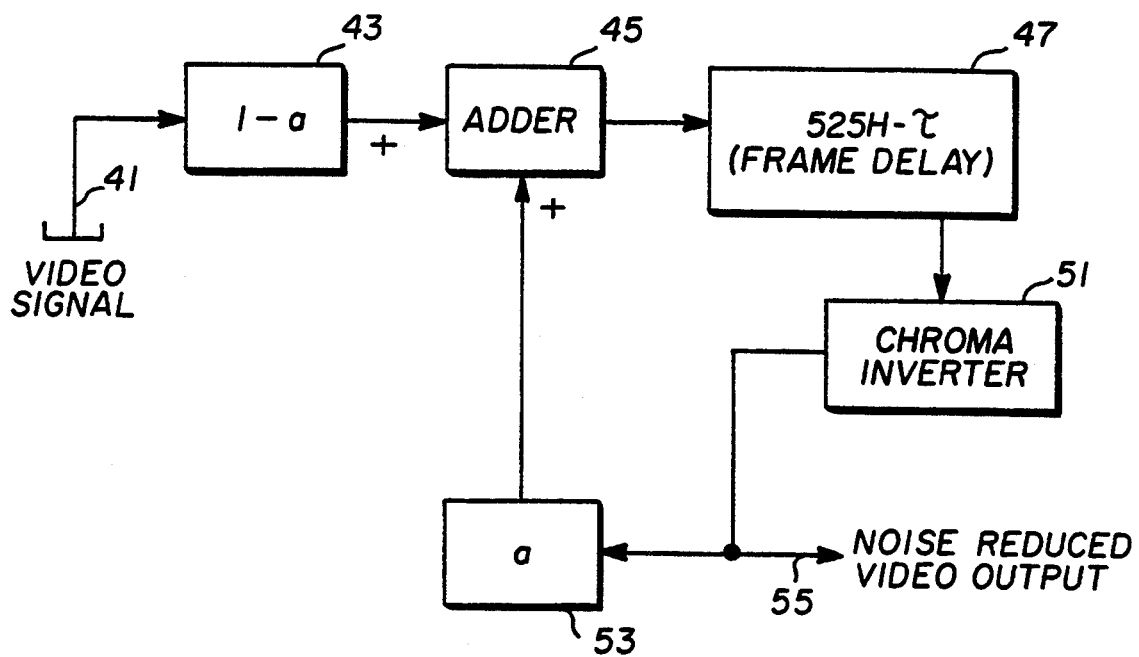
FIG. 5 shows an example of a frame averaging circuit for reducing noise in television images, which effectively corresponds to the illustration in FIG. 1 of the U.S. Patent of Kaiser et al, U.S. Pat. No. 4,064,530, entitled "Noise Reduction System for Color Television;"
Figure 11:
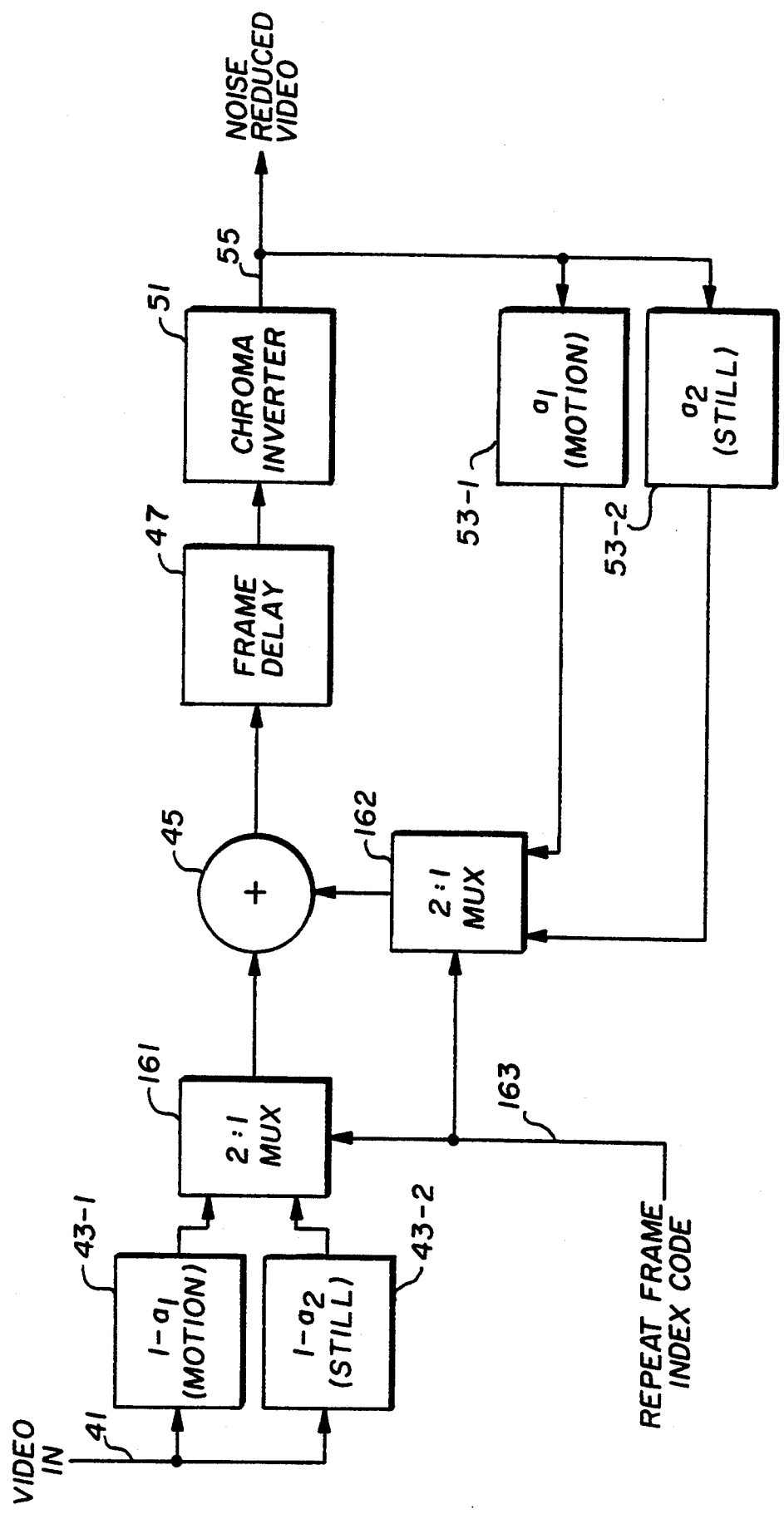
FIG. 11 diagrammatically illustrates an application of the image motion-dependent filtering mechanism of the present invention for reducing noise in television images using a modified recursive filter architecture of the type shown in FIG. 5.

FIG. 11 diagrammatically illustrates an application of the image motion-dependent filtering mechanism of the present invention for reducing noise in television images using a modified recursive filter architecture of the type described above with reference to FIG. 5. Specifically, video signals applied to input terminal 41 are coupled through first and second variable attenuators 43-1 and 43-2, which respectively scale the video input signal values by the difference between unity and first and second transmission constants 'a1' and 'a2', the values of which are some fraction of unity. The output of each variable attenuator is coupled to a respective input of a first 2:1 multiplexer 161, the output of which is coupled to one input of adder 45. The steering select input of multiplexer 161 is coupled over line 163 to receive a repeat frame index bit. A second input of adder 45 is coupled to the output of a second 2:1 multiplexer 162 a first input of which is coupled to the output of a first variable attenuator 53-1 whose transmission constant is 'a1' and to the output of a second variable attenuator 53-2 whose transmission constant is 'a2'. The constant 'a2' used for still images is larger than the constant 'a1' used for motion, such that a greater amount of temporal filtering is applied to still images as compared to motion images. The steering select input of multiplexer 162 is coupled to line 163 to receive the repeat frame index bit. The output of adder 45 is coupled to a frame delay 47, the output of which is subject to chroma inverter 51 and applied to output terminal 55. The output of chroma inverter 55 is itself scaled by each of attenuators 53-1 and 53-2, so as to be selectively applied, via multiplexer 162, to adder 45 and combined with the fractionally scaled video input signal output by multiplexer 161. For still images (repeated frames), the repeated frame index bit steers the outputs of multiplexers 161, 162 to the outputs of variable attenuators 43-2, 53-2. For motion images (non-repeated frames), the repeated frame index bit steers the outputs of multiplexers 161, 162 to the outputs of variable attenuators 43-1, 53-1.

Figure 12:
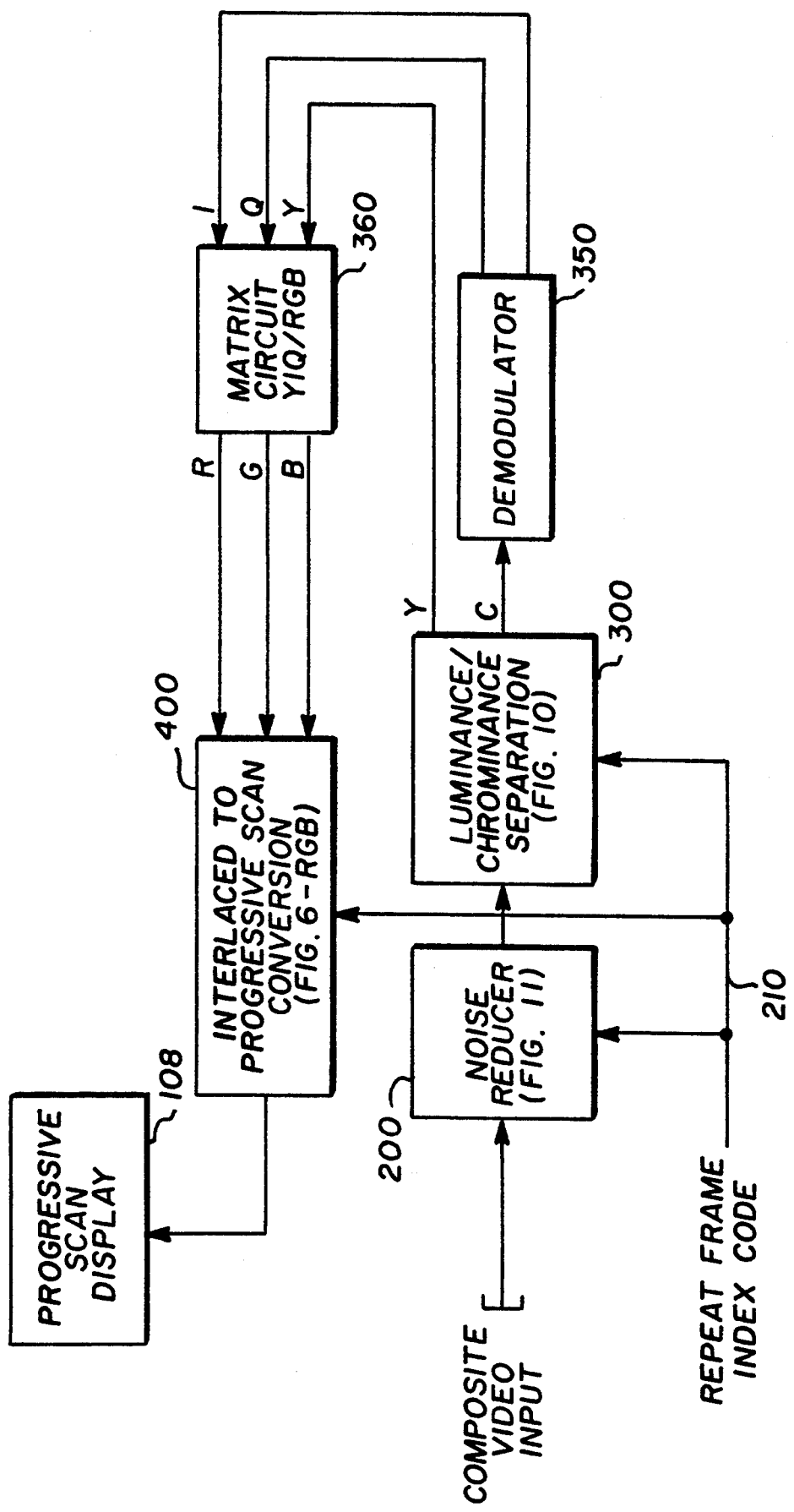
FIG. 12 diagrammatically illustrates a video processing architecture in which the respective selective filtering mechanisms of FIGS. 6, 10, and 11 are integrated together to eliminate interlace flicker, perform chrominance separation and reduce noise for both still and motion images.

FIG. 12 diagrammatically illustrates a video processing architecture in which the respective selective filtering mechanisms of FIGS. 6, 10, and 11 are integrated together to eliminate interlace flicker, perform chrominance separation and reduce noise for both still and motion images. A composite video signal is initially coupled to noise reduction unit 200, the internal configuration of which corresponds to that shown in FIG. 11, described above. The noise reduced signal output of noise reduction unit 200 is supplied to luminance/chrominance separation unit 300, the internal configuration of which corresponds to that shown in FIG. 10. The chrominance component output from separation unit 300 is converted via a demodulator 350 into respective in-phase (I) and quadrature (Q) components, which are coupled, together with the luminance output (Y) of separation unit 300, to a YIQ/RGB conversion matrix 360 for application to an RGB interlaced-to-progressive scan conversion unit 400, the internal configuration of which corresponds to that shown in FIG. 6, for each of the RGB signals, and the output of which is coupled to progressive scan display 108. Line 210 couples the repeat frame index bit for controlling the respective multiplexers of the selective filtering mechanisms of units 200, 300 and 400.

As will be appreciated from the foregoing description, the present invention provides a mechanism for selectively inserting an image modification operator into the image signal path of the display unit, so that the above described loss of definition and introduction of flicker resulting from the use of a median filter in the course of the display of a still or stationary image on an IDTV are effectively eliminated. In addition, the selective filter insertion mechanism in accordance with the invention may be employed to prevent the generation of cross-luminance and cross-color decoding artifacts, as well as reducing the amount of random noise in the image.

While I have shown and described several embodiments in accordance with the present invention, it is to be understood that the invention is not limited thereto, but is susceptible to numerous changes and modifications as known to a person skilled in the art. I therefore do not wish to be limited to the details shown and described herein, but rather intend to cover all such changes and modifications as are obvious to one of ordinary skill in the art.

What is claimed:

1. A system for use with a digitized image processing system in which images that have been captured on an image recording medium are digitized into image data and stored as image data files on a digital data base, said system controlling the manner in which the digitized images are accessed from the data base for retrieval and display, comprising a data base reader for reading from the digital data base the digitized image data of a respective data file in response to a first user command, means for manipulating the image in response to a second user command, a code generator for generating a video index code having a first value in response to manipulation of the image in accordance with the second user command, and a second value in the absence of such manipulation of the image.

2. A system as recited in claim 1, wherein said data base reader includes a compact disc player for playing a compact disc having image data files stored thereon.

3. A system as recited in claim 1, including a modulator for producing a modulated signal having first and second intervals, said modulated signal including image data for an image to be displayed during the first interval and including the video index code during the second interval, and an output for coupling the modulated signal to a signal processing apparatus.

4. A system as recited in claim 3, wherein the second interval is a display blanking interval.

5. A system as recited in claim 4, wherein said signal processing apparatus includes an input for receiving the modulated signal and a field store for storing image data contained in the modulated signal.

6. A system for providing television signals, comprising:
 a data base for storing a plurality of image data files containing digitized image data representing static images;
 means for selectively reading the image data from the image data files for display and manipulation in response to user commands;
 means for generating an image-containing television signal comprised of a sequence of television frames generated from said data base of static images; and
 means for generating a single video index code in association with each television frame, said video index code being incorporated into said image-containing television signal and having a first value in response to a respective television frame image being different from the previous television frame image, and a second value in response to said respective television frame image being the same as the previous television frame image.

7. A system as recited in claim 6, wherein said means for selectively reading the image data comprises a compact disc player for playing a compact disc having image data files stored thereon.

8. A system for providing television signals comprising:
 means for generating an image-containing television signal comprised of a sequence of television frames;
 means for generating a single video index code in association with each television frame, said video index code being incorporated into said image-containing television signal and having a first value in response to a respective television frame image being different from the previous television frame image, and a second value in response to said respective television frame image being the same as the previous television frame image; and
 means including an interpolation filter producing interpolated data for selectively modifying said image-containing television signal in dependence upon the value of said video index code.

9. A system for providing television signals comprising:
 means for generating an image-containing television signal comprised of a sequence of television frames;
 means for generating a single video index code in association with each television frame, said video index code being incorporated into said image-containing television signal and having a first value in response to a respective television frame image being different from the previous television frame image, and a second value in response to said respective television frame image being the same as the previous television frame image; and
 means including a median filter for selectively modifying said image-containing television signal in dependence upon the value of said video index code.

* * * * *